United States Patent
Wang et al.

(10) Patent No.: US 8,917,362 B2
(45) Date of Patent: Dec. 23, 2014

(54) TOUCH-SENSITIVE DISPLAY DEVICE

(75) Inventors: Wen-Chun Wang, Taichung (TW);
Ming-Sin Jian, Taichung County (TW);
San-Shien Wu, Taichung County (TW);
Ming-Chuan Lin, Taichung (TW); Chiu Wen Lo, Taichung (TW); Wen-Hung Wang, Taichung (TW); Shyh-Jeng Chen, Taichung County (TW);
Ping-Wen Chen, Taichung County (TW)

(73) Assignee: Wintek Corporation, Taichung (TW)

( * ) Notice: Subject to any disclaimer, the term of this patent is extended or adjusted under 35 U.S.C. 154(b) by 509 days.

(21) Appl. No.: 13/157,887

(22) Filed: Jun. 10, 2011

(65) Prior Publication Data

US 2011/0304572 A1     Dec. 15, 2011

(30) Foreign Application Priority Data

Jun. 14, 2010 (TW) ................. 99119223 A

(51) Int. Cl.
| | |
|---|---|
| G02F 1/1335 | (2006.01) |
| G06F 3/044 | (2006.01) |
| G02F 1/1333 | (2006.01) |
| G06F 3/041 | (2006.01) |
| G06K 11/06 | (2006.01) |
| G08C 21/00 | (2006.01) |

(52) U.S. Cl.
CPC ............. *G06F 3/044* (2013.01); *G06F 3/041* (2013.01)
USPC ............... 349/12; 349/40; 349/122; 349/162; 345/173; 178/18.01; 178/18.03

(58) Field of Classification Search
None
See application file for complete search history.

(56) References Cited

U.S. PATENT DOCUMENTS

| | | | | |
|---|---|---|---|---|
| 5,233,451 | A * | 8/1993 | Iguchi | 349/160 |
| 2007/0229479 | A1 * | 10/2007 | Choo et al. | 345/177 |
| 2008/0186418 | A1 * | 8/2008 | Kim et al. | 349/12 |
| 2009/0237596 | A1 * | 9/2009 | Park et al. | 349/69 |

(Continued)

FOREIGN PATENT DOCUMENTS

| | | |
|---|---|---|
| CN | 101504496 A | 8/2009 |
| TW | M344544 | 11/2008 |

(Continued)

OTHER PUBLICATIONS

Definition of "display;" Collins American Dictionary, online version; downloaded Feb. 28, 2014 from www.collinsdictionary.com.*
Definition of "unit;" Collins American Dictionary, online version; downloaded Feb. 28, 2014 from www.collinsdictionary.com.*

* cited by examiner (Continued)

*Primary Examiner* — Bumsuk Won
*Assistant Examiner* — Angela Davison
(74) *Attorney, Agent, or Firm* — Muncy, Geissler, Olds & Lowe, P.C.

(57) ABSTRACT

A touch-sensitive display device has an active display area and a non-active area and includes a touch-sensitive unit, a display unit and a liquid optical adhesive. The touch-sensitive unit has a touch-sensitive region substantially overlapping the active display area, and the display unit is disposed on one side of the touch-sensitive unit. The liquid optical adhesive is disposed between the touch-sensitive unit and the display unit to combine the touch-sensitive unit with the display unit, and an outer edge of the liquid optical adhesive is located in the non-active area of the touch-sensitive display device.

21 Claims, 8 Drawing Sheets

(56) References Cited

U.S. PATENT DOCUMENTS

| | | | |
|---|---|---|---|
| 2009/0244024 A1* | 10/2009 | Kurahashi | 345/173 |
| 2010/0015417 A1* | 1/2010 | Nakajima et al. | 428/195.1 |
| 2010/0066650 A1* | 3/2010 | Lee et al. | 345/64 |
| 2010/0123675 A1* | 5/2010 | Ippel | 345/173 |

FOREIGN PATENT DOCUMENTS

| | | |
|---|---|---|
| TW | 200915151 A | 4/2009 |
| TW | M359724 U1 | 6/2009 |
| TW | I317035 | 11/2009 |

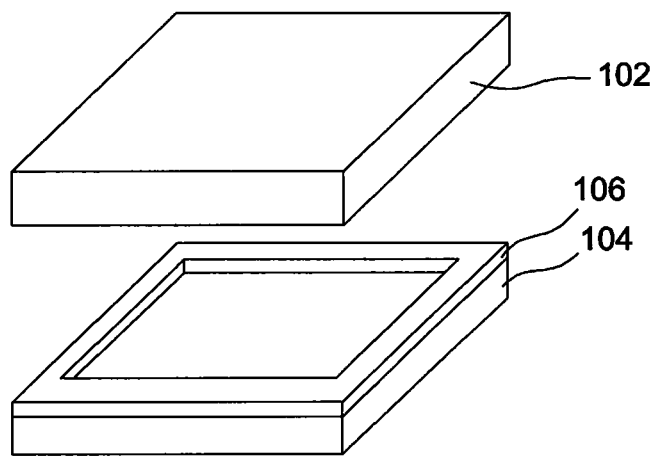
FIG. 11 (Prior Art)
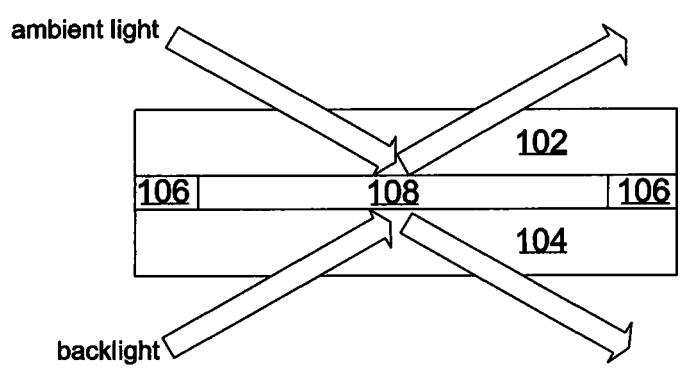
FIG. 12 (PriorArt)

TOUCH-SENSITIVE DISPLAY DEVICE

BACKGROUND OF THE INVENTION a. Field of the Invention

The invention relates to a touch-sensitive display device.

b. Description of the Related Art

FIG. 11 shows an exploded diagram of a conventional touch-sensitive display device. Referring to FIG. 11, a touch-sensitive display device 100 includes a touch panel 102 and a display panel 104. During the assembly of the touch-sensitive display device 100, an enclosed sealant 106 is formed on the display panel 104 by screen printing, and the touch panel 102 is attached to the display panel 104 by the sealant 106.

Typically, when light travels from a medium with a higher refractive index to a medium with a lower refractive index and an angle of incidence is greater than the critical angle, an optical phenomenon of total reflection occurs. Referring to FIG. 12, when the touch panel 102 and the display panel 104 are combined with each other, an air gap 108 is formed between the touch panel 102 and the display panel 104 and surrounded by the sealant 106. In case a substrate of the touch panel 102 is a glass substrate, and ambient light that travels from the glass substrate (refractive index equal to about 1.5) to the air gap 108 (refractive index equal to about 1) has an angle of incidence larger than the critical angle, total reflection may occur. Under the circumstance, glare is shone on a surface of the touch panel 102 to cause visual discomfort. Besides, backlight that travels from a glass substrate to the air gap 108 and has an angle of incidence larger than the critical angle may be totally reflected to lower backlight utilization efficiency.

BRIEF SUMMARY OF THE INVENTION

The invention provides a touch-sensitive display device having at least one advantages of anti-glare, high utilization efficiency of backlight, high production yields and improved electrostatic discharge protection.

According to an embodiment of the invention, a touch-sensitive display device has an active display area and a non-active area and includes a touch-sensitive unit, a display unit and a liquid optical adhesive. The touch-sensitive unit has a touch-sensitive region substantially overlapping the active display area, and the display unit is disposed on one side of the touch-sensitive unit. The liquid optical adhesive is disposed between the touch-sensitive unit and the display unit to combine the touch-sensitive unit with the display unit, and an outer edge of the liquid optical adhesive is located in the non-active area of the touch-sensitive display device.

In one embodiment, the thickness of the liquid optical adhesive is in the range of 50 um-350 um, and preferably 100 um or 175 um.

In one embodiment, the touch-sensitive unit includes a transparent substrate, a touch-sensing structure, a decorative layer and a passivation layer. The touch-sensing structure is disposed on the transparent substrate to form a touch-sensitive region. The touch-sensing structure includes a plurality of first sensing series and a plurality of second sensing series spaced apart from the first sensing series. The decorative layer is disposed on the transparent substrate in an area substantially overlapping the non-active area, and the passivation layer is disposed on the transparent substrate and at least covers the touch-sensing structure and the decorative layer.

In one embodiment, a first distance from the outer edge of the liquid optical adhesive to the active display area is larger than a second distance from the outer edge of the liquid optical adhesive to an end of the transparent substrate.

In one embodiment, each first sensing series includes a plurality of first transparent electrodes connected with each other by a plurality of first connecting lines, each second sensing series includes a plurality of second transparent electrodes connected with each other by a plurality of second connecting lines, the second connecting lines are formed in a fabrication process different to another fabrication process of the first connecting lines, the first transparent electrodes and the second transparent electrodes, and a dielectric layer is disposed between the corresponding first connecting lines and second connecting lines. The second connecting lines are disposed between the transparent substrate and the dielectric layer or between the dielectric layer and the passivation layer.

In one embodiment, the touch-sensitive display device further includes a plurality of metal traces disposed on the transparent substrate, and an interval between the outer edge of the liquid optical adhesive and an outer edge of the metal traces is larger than 0.5 mm.

In one embodiment, the decorative layer includes at least one of diamond-like carbon, ceramic, colored ink, resin and photo resist.

In one embodiment, a sealant is disposed between the touch-sensitive unit and the display unit, and the sealant surrounds the liquid optical adhesive and is adjacent to the outer edge of the liquid optical adhesive. The liquid optical adhesive may be a UV-curing liquid optical adhesive or a thermo-curing liquid optical adhesive.

In one embodiment, an anti-overflow structure is formed on at least one of the touch-sensitive unit and the display unit.

According to another embodiment of the invention, a touch sensitive display unit has an active display area and a non-active area and includes a display unit, a touch-sensitive unit, a cover glass and a liquid optical adhesive. The touch-sensitive unit is disposed on the display unit and has a touch-sensitive region substantially overlapping the active display area. The touch-sensitive unit includes a transparent substrate, a touch-sensing structure disposed on one side of the transparent substrate to form the touch-sensitive region, and a passivation layer disposed on the transparent substrate and at least covering the touch-sensing structure. The cover glass is disposed on the touch-sensitive unit and has a decorative layer located in the non-active area. The liquid optical adhesive is disposed between the touch-sensitive unit and the cover glass to combine the touch-sensitive unit with the cover glass, and an outer edge of the liquid optical adhesive is located in the non-active area of the touch-sensitive display device.

In one embodiment, a shielding layer is disposed on one side of the transparent substrate opposite the touch-sensing structure.

According to the above embodiments, since the outer edge of the liquid optical adhesive is located in the non-active area of the touch-sensitive display device, and the gap in the active display area is filled by the liquid optical adhesive, the phenomenon of total reflection due to different refractive indexes of media is avoided to prevent the formation of glare and increase the utilization efficiency of backlight. Besides, the liquid optical adhesive may spread over a larger area to enhance the connection strength between the touch-sensitive unit and the display unit and thus improve production yields. Further, the electrostatic discharge protection capability is improved by adjusting the thickness of the liquid optical adhesive and the interval between the liquid optical adhesive and metal traces.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 11 shows an exploded diagram of a conventional touch-sensitive display device.

FIG. 12 shows a schematic diagram of an assembled conventional touch-sensitive display device.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
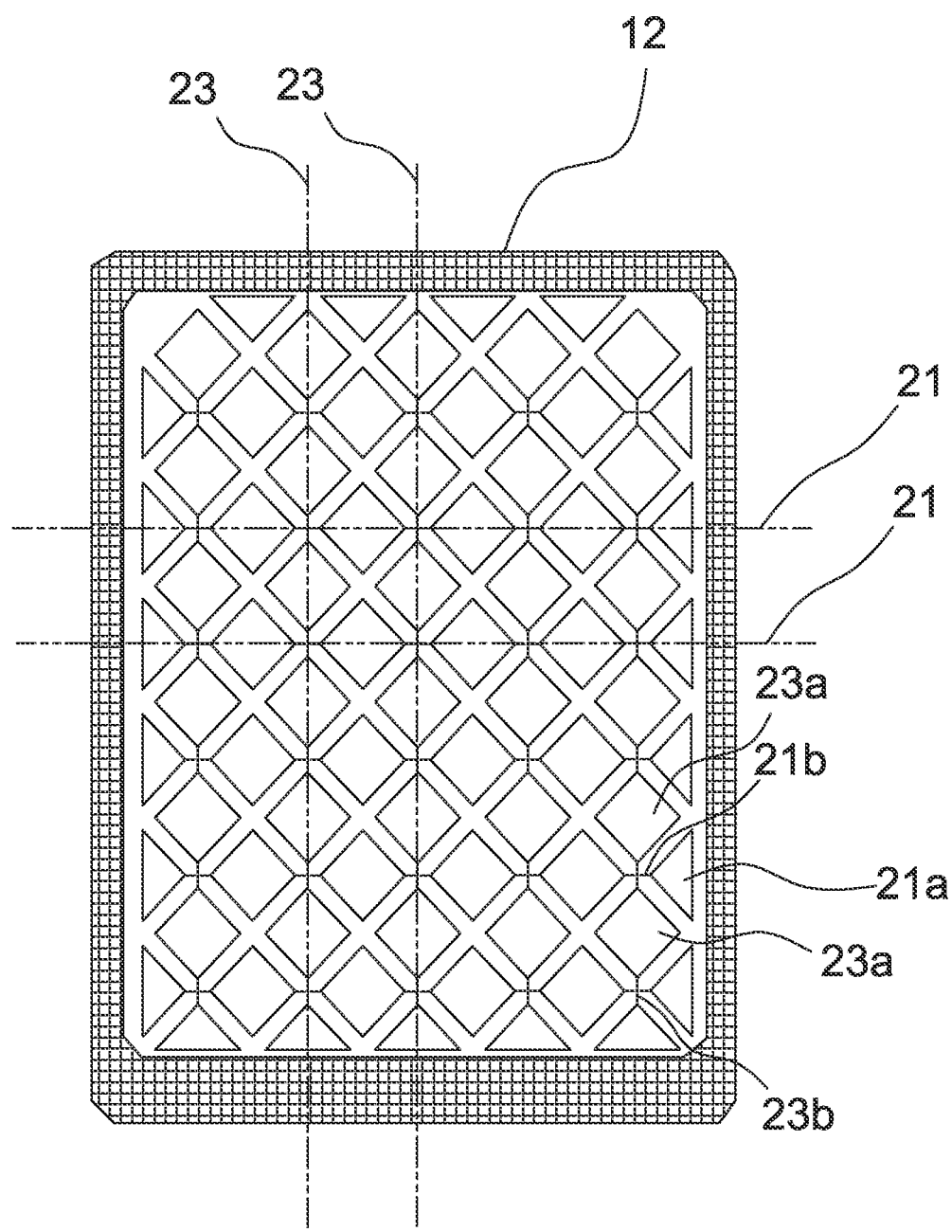
FIG. 1 shows a plan view of a touch-sensitive display device according to an embodiment of the invention.
Figure 2A:
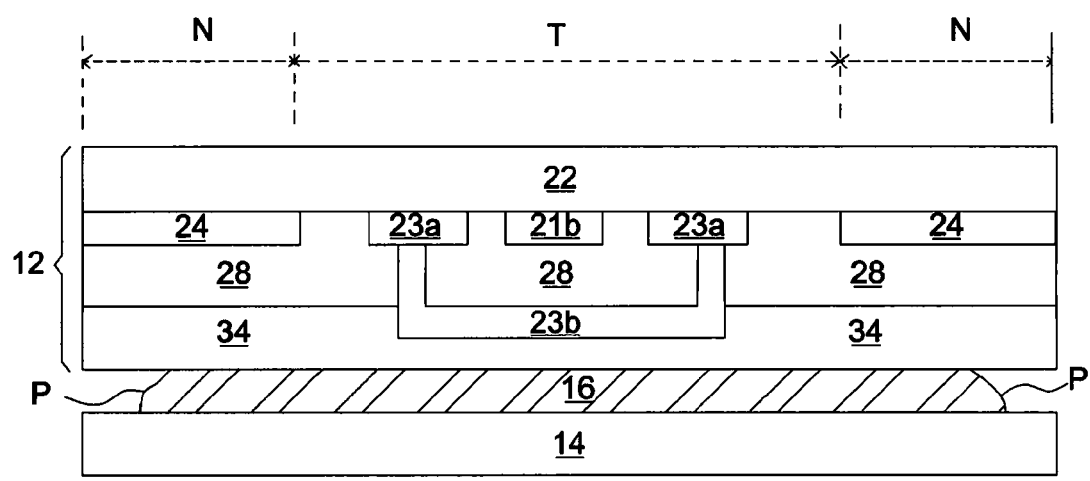
FIG. 2A shows an enlarged cross-section of FIG. 1.
Figure 2B:
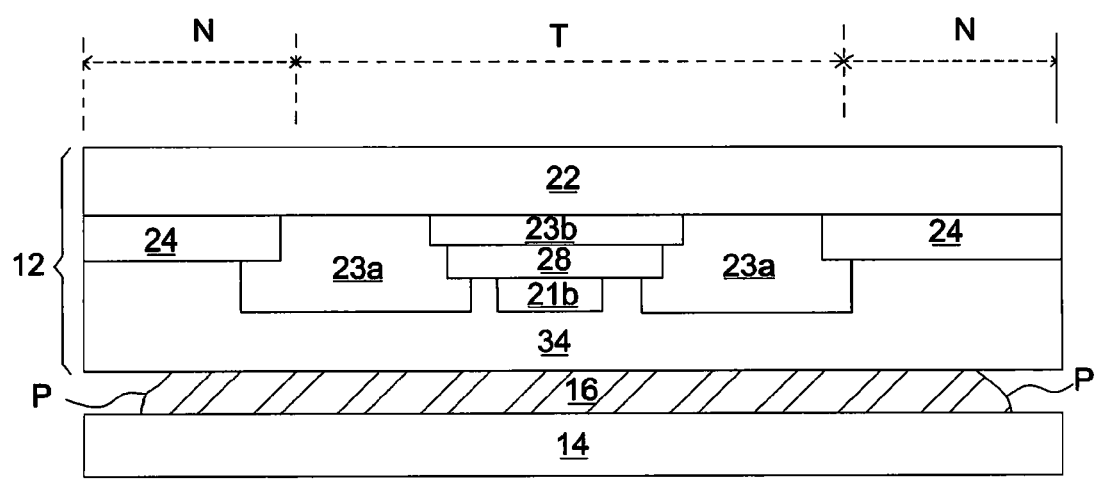
FIG. 2B shows a schematic cross-sectional diagram of a touch-sensitive display device according to another embodiment of the invention.

FIG. 1 shows a plan view of a touch-sensitive display device according to an embodiment of the invention. FIG. 2A shows an enlarged cross-section of FIG. 1. Please refer to both FIG. 1 and FIG. 2A, a touch-sensitive display device 10 includes a touch-sensitive unit 12 and a display unit 14 combined with each other by a liquid optical adhesive 16. The touch-sensitive display device 10 is divided into an active display area T and a non-active area N. The touch-sensitive unit 12 includes a transparent substrate 22 and a laminated structure formed on the transparent substrate 22. The material of the transparent substrate 22 includes, but not limited to, glass, polymethyl methacrylate (PMMA), polycarbonate (PC), polyethersulfones (PES), or polyethylene terephthalate (PET). The touch-sensitive unit 12 has a touch-sensing structure to detect touch operations and form a touch-sensitive region, and the touch-sensitive region substantially overlaps the active display area T. A decorative layer 24 is formed on one side of the transparent substrate 12 to shield metal traces (not shown), and the decorative layer 24 is formed in an area substantially overlapping the non-active area N. The material of the decorative layer 24 includes diamond-like carbon, ceramic, colored ink, resin, photo resist or the combination thereof. The touch-sensing structure may include a plurality of first sensing series 21 and a plurality of second sensing series 23 spaced apart from the first sensing series 21. A passivation layer 34 covers both a touch-sensing structure in the active display area T and a laminated structure in the non-active area N to protect the entire touch-sensitive unit 12. Each first sensing series 21 includes multiple first transparent electrodes 21a connected with each other by multiple first connecting lines 21b, each second sensing series 23 includes multiple second transparent electrodes 23a connected with each other by multiple second connecting lines 23b, and a dielectric layer 28 is disposed between the corresponding first connecting lines 21b and second connecting lines 23b. Referring to FIG. 2A, the second connecting lines 23b are formed in a fabrication process different to another fabrication process of the first connecting lines 21b, the first transparent electrodes 21a and the second transparent electrodes 23a. Besides, the second connecting lines 23b may be disposed between the dielectric layer 28 and the passivation layer 34. Note the forming positions of the second connecting lines 23b are not restricted. In an alternate embodiment shown in FIG. 2B, the second connecting lines 23b of the touch-sensitive display device 30 are disposed between the transparent substrate 22 and the dielectric layer 28.

According to the embodiment shown in FIG. 2A, after the touch-sensitive display device 10 is assembled, the liquid optical adhesive 16 between the touch-sensitive unit 12 and the display unit 14 forms an outer edge P, and the outer edge P is located in the non-active area N of the touch-sensitive display device 10. Further, in one embodiment, a gap formed between the touch-sensitive unit 12 and the display unit 14 and in the active display area T is entirely filled by the liquid optical adhesive 16.

Figure 3:
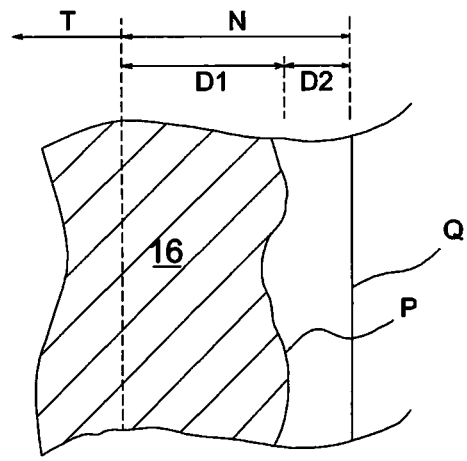
FIG. 3 shows a schematic diagram illustrating the distribution of a liquid optical adhesive according to an embodiment of the invention.

According to the above embodiments, since the outer edge P of the liquid optical adhesive 16 is located in the non-active area N of the touch-sensitive display device 10, and the gap in the active display area T is filled by the liquid optical adhesive 16, the phenomenon of total reflection due to different refractive indexes of media is avoided to prevent the formation of glare and increase the utilization efficiency of backlight. Besides, the liquid optical adhesive 16 in the above embodiment may spread over a larger area to enhance the connection strength between the touch-sensitive unit 12 and the display unit 14 and thus improve production yields. Referring to FIG. 3, in one embodiment, a first distance D1 from the outer edge P of the liquid optical adhesive 16 to the active display area T is larger than a second distance D2 from the outer edge P of the liquid optical adhesive 16 to an end Q of the transparent substrate 22 (D1>D2) to ensure sufficient bonding areas.

Figure 4:
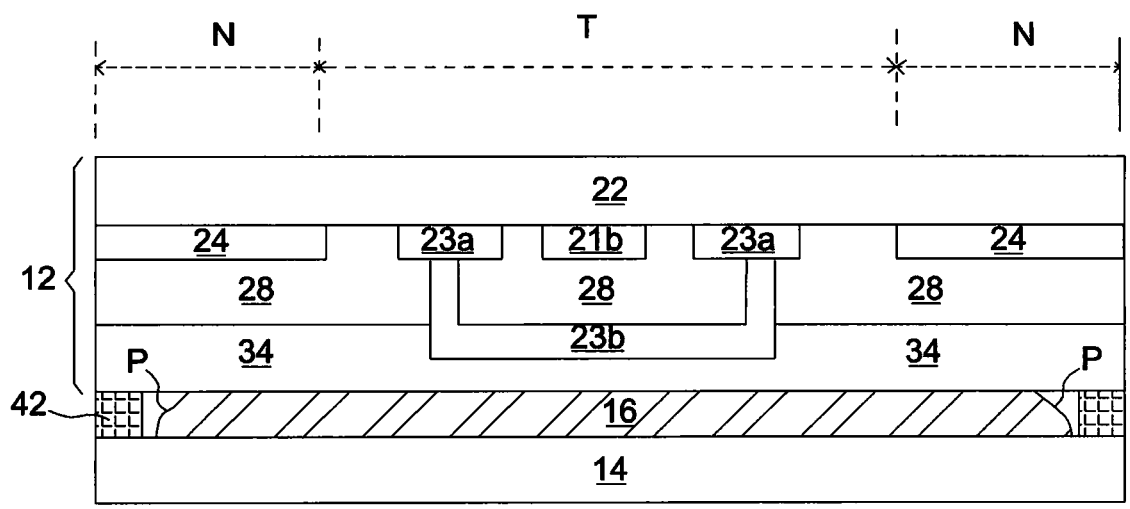
FIG. 4 shows a schematic cross-sectional diagram of a touch-sensitive display device according to another embodiment of the invention.

FIG. 4 shows a schematic cross-sectional diagram of a touch-sensitive display device according to another embodiment of the invention. Referring to FIG. 4, a sealant 42 of a touch-sensitive display device 40 is disposed between the touch-sensitive unit 12 and the display unit 14. The sealant 42 surrounds the liquid optical adhesive 16 and is adjacent to the outer edge P of the liquid optical adhesive 16. The liquid optical adhesive 16 may be a UV-curing liquid optical adhesive or a thermo-curing liquid optical adhesive.

Figure 5:
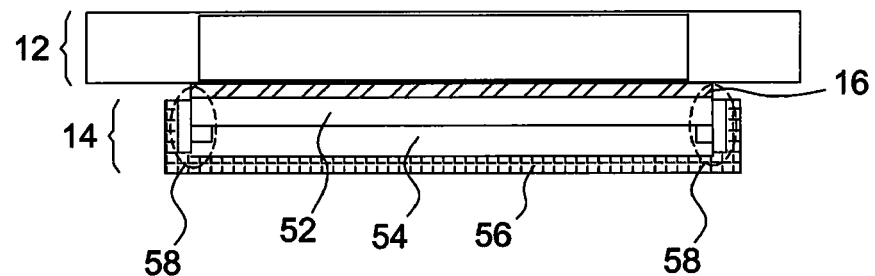
FIG. 5 to FIG. 7 show schematic diagrams illustrating an anti-overflow structure according to an embodiment of the invention.
Figure 6:
Figure 7:
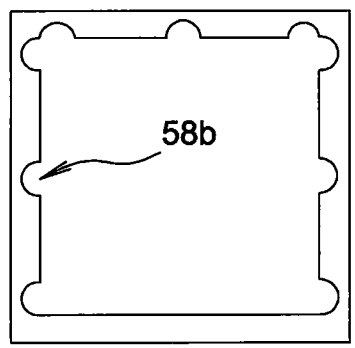
Figure 8:
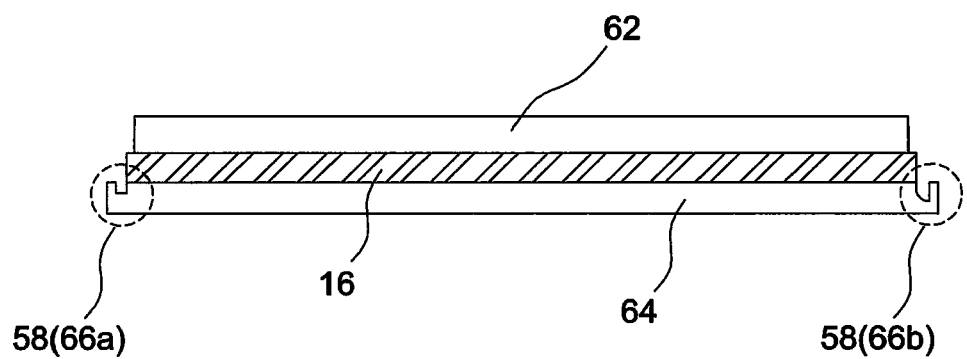
FIG. 8 shows a schematic diagram of an anti-overflow structure according to another embodiment of the invention.

Typically, the overflow amount of the liquid optical adhesive 16 depends on the thickness of the liquid optical adhesive 16. Therefore, the amount and dispensing patterns of the liquid optical adhesive 16 are optimized to allow the dispersed liquid optical adhesive 16 to align with ends of the transparent substrate 22 as possible. Then, the dispersed liquid optical adhesive 16 can be hardened by a UV lamp or a heater. Referring to FIG. 5, a touch-sensitive unit 12 and a display unit 14 of a touch-sensitive display device 50 are combined with each other by a liquid optical adhesive 16. The display unit 14 may include an LCD panel 52, a light guide plate 54, and a frame 56 for accommodating the LCD panel 52 and the light guide plate 54. An anti-overflow structure 58 is formed on the touch-sensitive unit 12 or the display unit 14 to prevent overflow of the liquid optical adhesive 16 and ensure production yields as a result. For example, the anti-overflow structure 58 may be correspondingly formed on the periphery of the light guide plate 54 and the frame 56. For example, at least one notch 58a is formed on the light guide plate 54 (shown in FIG. 6), and multiple slots 58b adjacent to the notch 58a are formed on an inner wall of the frame 56 (shown in FIG. 7) to contain the overflow of the liquid optical adhesive 16. In an alternate embodiment shown in FIG. 8, a cover glass 64 is attached to a double-sided ITO touch panel 62 by the liquid optical adhesive 16, and at least one anti-overflow structure 58 is formed on an end of the cover glass 64. The shape of the anti-overflow structure 58 is not limited. For example, as shown in FIG. 8, the anti-overflow structure 58 may include a rectangular-shaped slot 66a or a miter cut slot 66b.

Figure 9:
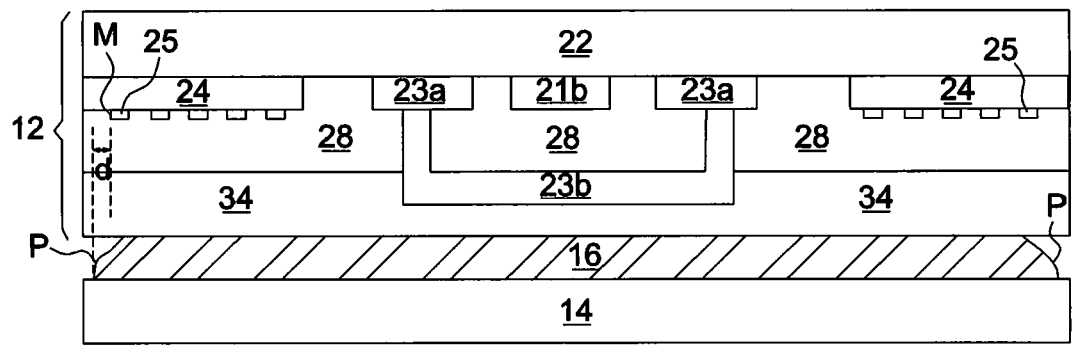
FIG. 9 shows a schematic cross-sectional diagram of a touch-sensitive display device according to another embodiment of the invention.
Figure 10:
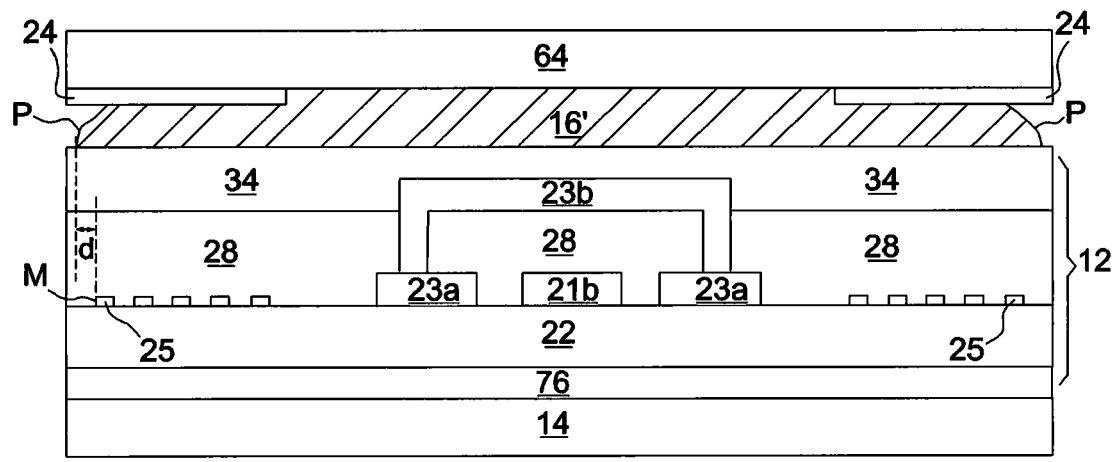
FIG. 10 shows a schematic cross-sectional diagram of a touch-sensitive display device according to another embodiment of the invention.

Note the liquid optical adhesive 16 in the above embodiments may also serve as an antistatic layer to enhance electrostatic discharge (ESD) protection. According to a measurement performed by inventors, in case the thickness of the liquid optical adhesive 16 is in the range of 50 um-350 um, an endurable ESD voltage is increased to 13 KV or more. Further, in one embodiment, the thickness of the liquid optical adhesive 16 is preferably set as 100 um or 175 um. As shown in FIG. 9, in a touch-sensitive display device 70, multiple metal traces 25 are disposed on the decorative layer 24. An interval d between the outer edge P of the liquid optical adhesive 16 and an outer edge M of the metal traces 25 may be set as larger than 0.5 mm. According to a measurement performed by inventors, in case the interval d is larger than 0.5 mm, an endurable ESD voltage is increased to 15 KV or more. According to the above embodiment, the electrostatic discharge is solved by insulation method rather than release method, because the residue of the electrostatic charge may damage surrounding devices when the electrostatic discharge is out of the release tolerance. As shown in FIG. 10, in an alternate embodiment, a touch-sensitive unit 12 is disposed on a display unit 14 of a touch-sensitive display device 80, and a touch-sensing structure is disposed on one side of the transparent substrate 22 to form a touch-sensitive region. A passivation layer 34 is disposed on the transparent substrate 22 and at least covers the touch-sensing structure. A cover glass 64 is disposed on the touch-sensitive unit 12 and has a decorative layer 24 located in a non-active area of the touch-sensitive display device 80. A liquid optical adhesive 16' is disposed between the touch-sensitive unit 12 and the cover glass 64 to combine the touch-sensitive unit 12 with the cover glass 64. An outer edge P of the liquid optical adhesive 16' is located in the non-active area of the touch-sensitive display device 80, and an interval d formed between an outer edge P of the liquid optical adhesive 16' and an outer edge M of the metal traces 25 may be set as larger than 0.5 mm. Further, a shielding layer 76 is disposed on one side of the transparent substrate 22 opposite the touch-sensing structure to reduce crosstalk noises made between the touch-sensitive unit 12 and the display unit 14. Further, the liquid optical adhesive 16' in this embodiment also serves as an antistatic layer to enhance ESD protection. According to a measurement performed by inventors, an endurable ESD voltage for the touch-sensitive display device 80 is increased to 13 KV or more.

Note the configuration of a touch-sensing structure in the touch-sensitive region is not restricted, as long as the effect of detecting touch operations is achieved. For example, the touch-sensing structure may be an underground electrode structure, a bridge electrode structure or other electrode structure. The type of the display unit 14 includes but not limited to a liquid crystal display, an organic light-emitting diode display, an electro-wetting display, a bi-stable display, and an electrophoretic display.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention.

It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Each of the terms "first" and "second" is only a nomenclature used to modify its corresponding elements. These terms are not used to set up the upper limit or lower limit of the number of bumps.

What is claimed is:

1. A touch sensitive display device, comprising:
   a touch-sensitive unit, wherein the touch-sensitive unit comprises:
      a transparent substrate;
      a touch-sensing structure disposed on the transparent substrate and comprising a plurality of electrodes;
      a decorative layer disposed on at least a part of a periphery of the transparent substrate;
      a passivation layer disposed on the transparent substrate and covering at least a part of the touch-sensing structure and at least a part of the decorative layer; and
      a plurality of traces disposed on the decorative layer;
   a display unit disposed on one side of the touch-sensitive unit; and
   a liquid optical adhesive disposed between the touch-sensitive unit and the display unit and in contact with the touch-sensitive unit and the display unit to combine the touch-sensitive unit with the display unit, wherein a space enclosed and bordered by the touch-sensitive unit, the display unit and the outer edge of the liquid optical adhesive is entirely filled by the liquid optical adhesive, the liquid optical adhesive is located between the plurality of electrodes and the display unit and located between an innermost trace and the display unit, and the liquid optical adhesive serves as an antistatic layer to shield at least the innermost trace and the electrodes from electrostatic discharge.

2. The touch-sensitive display device as claimed in claim 1, wherein an interval between the outer edge of the liquid optical adhesive and an outer edge of the traces is larger than 0.5 mm.

3. The touch-sensitive display device as claimed in claim 2, wherein the thickness of the liquid optical adhesive is in the range of 50 um-350 um.

4. The touch-sensitive display device as claimed in claim 3, wherein the thickness of the liquid optical adhesive is 100 um or 175 um.

5. The touch-sensitive display device as claimed in claim 1, wherein the decorative layer comprises at least one of diamond-like carbon, ceramic, colored ink, resin and photo resist.

6. The touch-sensitive display device as claimed in claim 1, further comprising:
   a sealant disposed between the touch-sensitive unit and the display unit, wherein the sealant surrounds the liquid optical adhesive and is adjacent to the outer edge of the liquid optical adhesive.

7. The touch-sensitive display device as claimed in claim 1, wherein the liquid optical adhesive is a UV-curing liquid optical adhesive or a thermo-curing liquid optical adhesive.

8. The touch-sensitive display device as claimed in claim 1, further comprising:
   an anti-overflow structure formed on at least one of the touch-sensitive unit and the display unit.

9. The touch-sensitive display device as claimed in claim 8, wherein the display unit includes a light guide plate and a frame accommodating the light guide plate, and the anti-overflow structure comprising:
   at least one notch formed on the light guide plate; and
   at least one slot formed on the frame and adjacent to the notch.

10. The touch-sensitive display device as claimed in claim 8, wherein the touch-sensitive unit comprises a cover glass, and the anti-overflow structure comprises at least one slot formed on the cover glass.

11. The touch-sensitive display device as claimed in claim 1, wherein the display unit comprises a liquid crystal display, an organic light-emitting diode display, an electro-wetting display, a bi-stable display, or an electrophoretic display.

12. The touch-sensitive display device as claimed in claim 1, wherein the plurality of electrodes comprises first electrodes and second electrodes, the touch-sensing structure comprises a plurality of first sensing series and a plurality of second sensing series spaced apart from the first sensing series, each of the first sensing series comprises the first electrodes connected with each other by a plurality of first connecting lines, and each of the second sensing series comprises the second electrodes connected with each other by a plurality of second connecting lines.

13. The touch-sensitive display device as claimed in claim 12, wherein the first connecting lines and the second connecting lines are formed by different fabrication processes.

14. The touch-sensitive display device as claimed in claim 12, further comprising:
   a dielectric layer disposed on the transparent substrate and covering the first electrodes, the second electrodes and the first connecting lines, wherein the dielectric layer has openings to expose a part of each of the second electrodes, and each of the second connecting lines is in contact with the exposed part.

15. The touch-sensitive display device as claimed in claim 14, wherein the first connecting lines are disposed on a surface of the transparent substrate, and the second connecting lines are disposed between the dielectric layer and the passivation layer.

16. The touch-sensitive display device as claimed in claim 12, further comprising:
   a dielectric layer disposed between the first connecting lines and the second connecting lines.

17. The touch-sensitive display device as claimed in claim 16, wherein the second connecting lines are disposed on a surface of the transparent substrate, and the first connecting lines are disposed on the dielectric layer.

18. The touch-sensitive display device as claimed in claim 16, wherein at least one of the second electrodes covers a part of the dielectric layer.

19. The touch-sensitive display device as claimed in claim 16, wherein at least one of the second electrodes has at least one step portion, and the step portion touches at least one of the second conducting wires and the dielectric layer.

20. A touch sensitive display device, comprising:
   a touch-sensitive unit, comprising:
      a transparent substrate;
      a touch-sensing structure disposed on the transparent substrate, wherein the touch-sensing structure comprises a plurality of first sensing series and a plurality of second sensing series spaced apart from the first sensing series, each of the first sensing series comprises a plurality of first electrodes connected with each other by a plurality of first connecting lines, each of the second sensing series comprises a plurality of second electrodes connected with each other by a plurality of second connecting lines, and the first connecting lines and the second connecting lines crossing over each other to form a plurality of intersections;

a plurality of traces disposed on at least a part of a periphery of the transparent substrate; and a decorative layer disposed overlapping the traces;

a display unit disposed on one side of the touch-sensitive unit; and a liquid optical adhesive in the form of a continuous layer disposed on one side of the touch-sensitive unit and in contact with the touch-sensitive unit, wherein the liquid optical adhesive covers the plurality of first electrodes, the plurality of second electrodes, the plurality of intersections of connecting lines and an innermost trace of the plurality of traces to serve as an antistatic layer to shield at least the innermost trace, the first electrodes, the second electrodes and the intersections from electrostatic discharge.

21. A touch sensitive display device having an active display area and a non-active area, comprising:

a touch-sensitive unit having a touch-sensitive region substantially overlapping the active display area, wherein the touch-sensitive unit comprises:

a cover glass;

a touch-sensing structure disposed on the cover glass and comprising a plurality of electrodes;

a decorative layer disposed on at least a part of a periphery of the cover glass; and a plurality of traces disposed on the decorative layer and in the non-active area;

a display unit disposed on one side of the touch-sensitive unit; and a liquid optical adhesive disposed between the touch-sensitive unit and the display unit and in contact with the touch-sensitive unit and the display unit to combine the touch-sensitive unit with the display unit, wherein an outer edge of the liquid optical adhesive is located in the non-active area of the touch-sensitive display device, a space enclosed and bordered by the touch-sensitive unit, the display unit and the outer edge of the liquid optical adhesive is filled by the liquid optical adhesive, and the liquid optical adhesive is located between the plurality of electrodes and the display unit and located between a trace nearest the active display area of the plurality of traces and the display unit, and the liquid optical adhesive serves as an antistatic layer to shield at least the trace nearest the active display area and the electrodes from electrostatic discharge.

* * * * *